(12) United States Patent  
Miki

(10) Patent No.: US 12,228,649 B2  
(45) Date of Patent: Feb. 18, 2025

(54) DISTANCE MEASUREMENT CORRECTION DEVICE, DISTANCE MEASUREMENT CORRECTION SYSTEM, DISTANCE MEASUREMENT CORRECTION METHOD, AND COMPUTER READABLE MEDIUM

(71) Applicant: Mitsubishi Electric Corporation, Tokyo (JP)

(72) Inventor: Yohei Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 983 days.

(21) Appl. No.: 17/228,003

(22) Filed: Apr. 12, 2021

(65) Prior Publication Data

US 2021/0231804 A1 Jul. 29, 2021

Related U.S. Application Data

(63) Continuation of application No. PCT/JP2018/045486, filed on Dec. 11, 2018.

(51) Int. Cl.
- *G01S 17/58* (2006.01)
- *G01S 7/497* (2006.01)
- *G01S 17/931* (2020.01)

(52) U.S. Cl.
CPC .............. *G01S 17/58* (2013.01); *G01S 7/497* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,805,527 A | 9/1998 | Hoashi et al. | |
| 2002/0044048 A1* | 4/2002 | Watanabe | G06V 20/58 340/436 |

(Continued)

FOREIGN PATENT DOCUMENTS

| | | |
|---|---|---|
| JP | 9-236661 A | 9/1997 |
| JP | 2005-216160 A | 8/2005 |

(Continued)

OTHER PUBLICATIONS

International Search Report for PCT/JP2018/045486 mailed on Mar. 5, 2019.

(Continued)

*Primary Examiner* — Hovhannes Baghdasaryan
(74) *Attorney, Agent, or Firm* — Birch, Stewart, Kolasch & Birch, LLP

(57) ABSTRACT

A distance measurement correction device (10) corrects distance measurement information (31) between a sensor (1) and a body. A movement calculation unit (202) calculates respective movement distances of the body with respect to the sensor (1) in a plurality of directions as pieces of movement information (32), on the basis of a difference between distance measurement information (31) measured on a current occasion by the sensor (1) and distance measurement information measured on a previous occasion by the sensor (1). A correction direction extraction unit (203) calculates movement velocities of the body as body movement velocities using the respective pieces of movement information (32) for the plurality of directions and extracts a direction, for which the distance measurement information (31) is to be corrected, as a correction direction (33) from among the plurality of directions, on the basis of the body movement velocities. A distance measurement information correction unit (301) calculates a distance from the sensor (1) to the body for the correction direction (33) at a correc- (Continued)

tion time point between a time point of measurement on the previous occasion by the sensor (1) and a time point of measurement on the current occasion by the sensor as post-correction distance measurement information (34).

10 Claims, 7 Drawing Sheets

(56) References Cited

U.S. PATENT DOCUMENTS

| | | | |
|---|---|---|---|
| 2009/0060275 A1 | 3/2009 | Hamada | |
| 2010/0046802 A1* | 2/2010 | Watanabe | G01S 17/894 |
| | | | 348/46 |
| 2016/0209499 A1 | 7/2016 | Suzuki | |

FOREIGN PATENT DOCUMENTS

| | | |
|---|---|---|
| JP | 2009-59060 A | 3/2009 |
| JP | 4952298 B2 | 6/2012 |
| JP | 2013-156139 A | 8/2013 |
| JP | 2014-197353 A | 10/2014 |
| WO | WO 2016/002776 A1 | 1/2016 |

OTHER PUBLICATIONS

German Office Action for German Application No. 11 2018 008 130.3, dated Jun. 7, 2022, with an English translation.

* cited by examiner

DISTANCE MEASUREMENT CORRECTION DEVICE, DISTANCE MEASUREMENT CORRECTION SYSTEM, DISTANCE MEASUREMENT CORRECTION METHOD, AND COMPUTER READABLE MEDIUM

CROSS REFERENCE TO RELATED APPLICATION

This application is a Continuation of PCT International Application No. PCT/JP2018/045486, filed on Dec. 11, 2018, which is hereby expressly incorporated by reference into the present application.

TECHNICAL FIELD

The present invention relates to a distance measurement correction device, a distance measurement correction system, a distance measurement correction method, and a distance measurement correction program.

BACKGROUND ART

Patent Literature 1 discloses a two-dimensional optical scanning device which performs scanning with a beam of light and forms an image at a scanning surface. The two-dimensional optical scanning device in Patent Literature 1 has a polariscope which performs scanning while deflecting light emitted from a light source in two intersecting axial directions and control means for causing deflection angles of the two intersecting axial directions to vary with a predetermined frequency and a predetermined amplitude.

CITATION LIST

Patent Literature

Patent Literature 1: JP 4952298

SUMMARY OF INVENTION

Technical Problem

A sensor, such as a LiDAR (Laser Imaging Detection and Ranging), is used to measure scattered light caused by application of a laser which emits pulsed light and analyze a distance to a body at a long distance or a property of the body. In a case where a sensor, such as a LiDAR, calculates a distance in each direction while controlling an amplitude and a phase with a conventional mechanism, when a body as a subject is moving, a distance measurement result for an adjacent direction may not be a distance measurement result for an adjacent time. If such a distance measurement result is used without change, a detection result such as the size or shape of a body may be incorrect.

The present invention has as its object to improve accuracy of body detection using distance measurement information from a sensor.

Solution to Problem

A distance measurement correction device that corrects distance measurement information between a sensor and a body, at least one of which moves, the distance measurement information being respective distances in a plurality of directions from the sensor to the body that are measured through one cycle by the sensor, according to the present invention, includes:

a movement calculation unit to calculate respective movement distances of the body with respect to the sensor in the plurality of directions as pieces of movement information, on the basis of a difference between distance measurement information measured on a current occasion by the sensor and distance measurement information measured on a previous occasion by the sensor;

a correction direction extraction unit to calculate movement velocities of the body as body movement velocities using the respective pieces of movement information for the plurality of directions and to extract a direction, for which the distance measurement information is to be corrected, as a correction direction from among the plurality of directions, on the basis of the body movement velocities; and a distance measurement information correction unit to calculate a distance from the sensor to the body for the correction direction at a correction time point between a time point of measurement on the previous occasion by the sensor and a time point of measurement on the current occasion by the sensor as post-correction distance measurement information.

Advantageous Effects of Invention

In the distance measurement correction device according to the present invention, the correction direction extraction unit extracts a direction, in which the body is caught, as the correction direction from among the plurality of directions from the sensor to the body. The distance measurement information correction unit calculates the distance from the sensor to the body for the correction direction at the correction time point between the time point of measurement on the previous occasion by the sensor and the time point of measurement on the current occasion by the sensor and sets the distance as the post-correction distance measurement information. Thus, the distance measurement correction device according to the present invention can improve accuracy of body detection using distance measurement information from the sensor.

DESCRIPTION OF EMBODIMENTS

Figure 1:
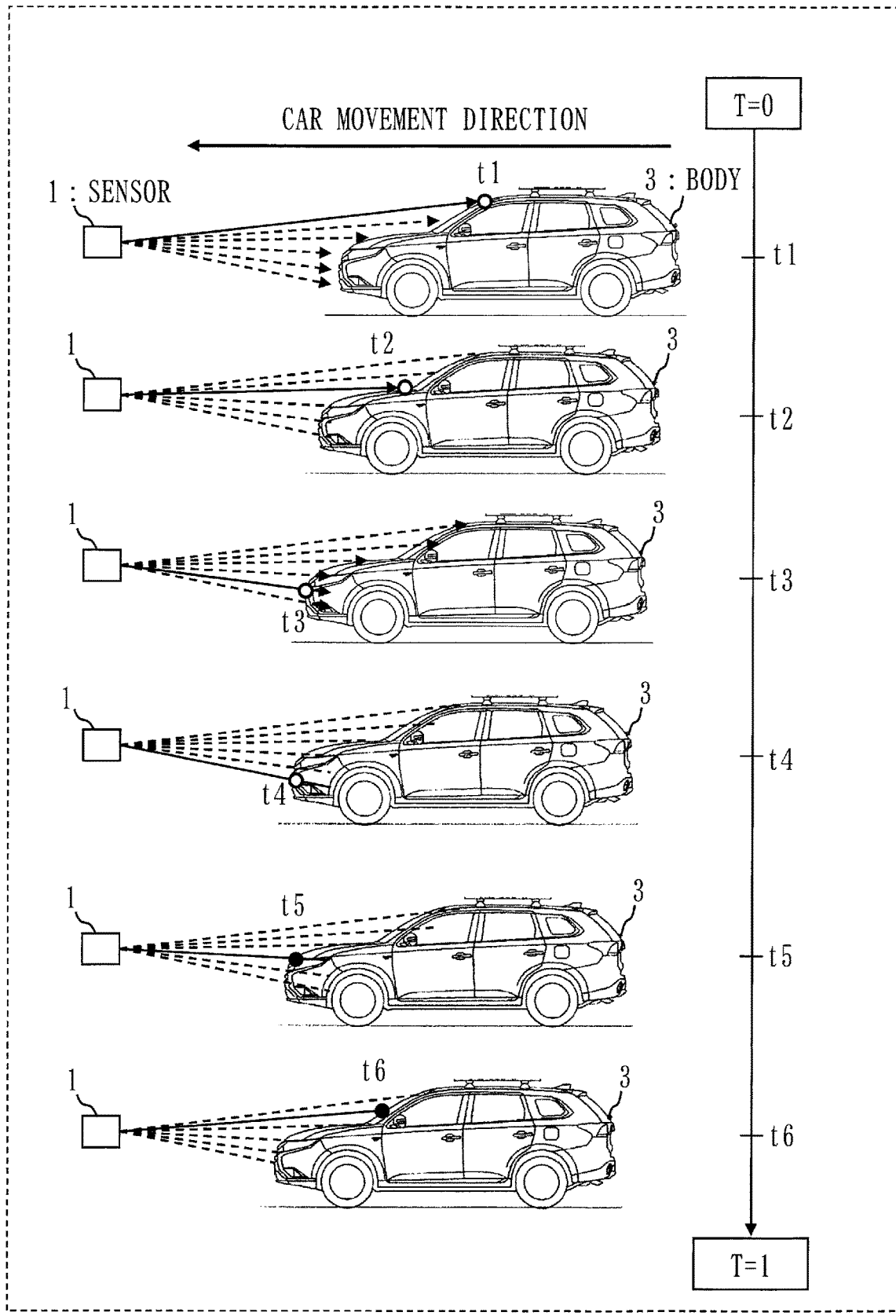
FIG. 1 is a diagram showing detection positions when distance measurement of a moving body is performed.

Embodiments of the present invention will be described below with reference to the drawings. Note that identical or corresponding portions in the drawings are denoted by identical reference characters. A description of an identical or corresponding portion will be appropriately omitted or simplified in the description of the embodiments.

Embodiment 1

*Description of Configuration*

Figure 2:
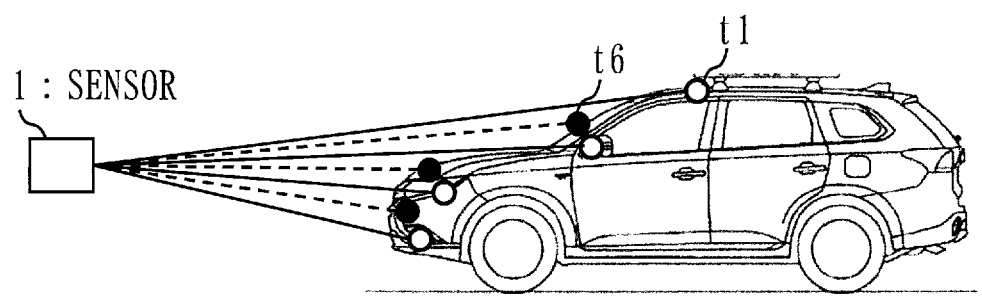
FIG. 2 is a diagram representing, as pieces of data for an identical time, pieces of data for one frame.

FIG. 1 is a diagram showing detection positions when distance measurement of a moving body is performed. FIG. 2 is a diagram representing, as pieces of data for an identical time, pieces of data for one frame.

In FIG. 1, distance measurement is performed for respective directions over a time period from a time t1 to a time t6 in order to acquire pieces of data for one frame by a sensor 1. FIG. 2 is a diagram representing, as pieces of data for an identical time, a result of the distance measurement.

As shown in FIG. 2, data adjacent to a distance measurement result for a direction obtained at the time t1 is a distance measurement result obtained at the time t6. Use of the distance measurement results without change makes the size or shape of a body incorrect, as shown in FIG. 2. Such a phenomenon may occur similarly in a case where a sensor itself moves.

The present embodiment will describe an aspect which extracts a region of a moving body using a distance measurement result for one frame acquired on a current occasion and a distance measurement result for a previous frame acquired on a previous occasion, calculates distance measurement results for all directions for an identical time, and detects the shape and size of the body.

Figure 3:
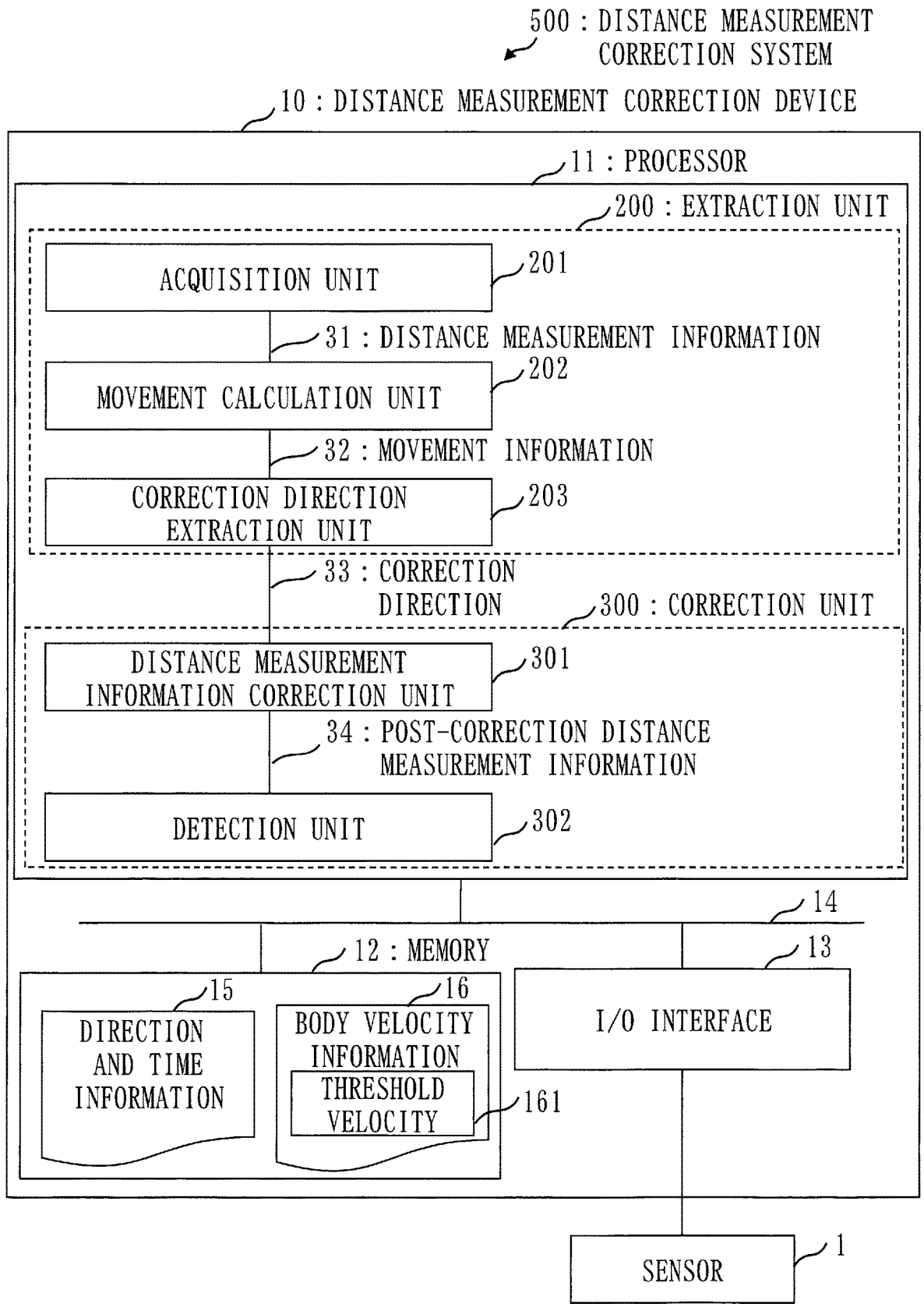
FIG. 3 is a configuration diagram of a distance measurement correction system according to Embodiment 1.

FIG. 3 is a configuration diagram of a distance measurement correction system 500 according to the present embodiment.

The distance measurement correction system 500 according to the present embodiment includes a distance measurement correction device 10 and the sensor 1. Specifically, the sensor 1 is a laser sensor, such as a LiDAR.

The distance measurement correction device 10 is a computer. The distance measurement correction device 10 is a car-mounted computer in the present embodiment. The distance measurement correction device 10, however, may be a server computer, such as a cloud server, which is installed at a distant site. The sensor 1, such as a LiDAR, is mounted on a vehicle on which the distance measurement correction device 10 is mounted. The distance measurement correction device 10 is connected to the sensor 1 by wire or wirelessly.

The distance measurement correction system 500 is also called a LiDAR detection result correction device.

The distance measurement correction device 10 includes a processor 11 and also includes other pieces of hardware, such as a memory 12 and an I/O interface 13. The processor 11 is connected to the other pieces of hardware via a signal line 14 and controls the other pieces of hardware.

The distance measurement correction device 10 includes, as functional elements, an extraction unit 200 and a correction unit 300. The extraction unit 200 includes an acquisition unit 201, a movement calculation unit 202, and a correction direction extraction unit 203. The correction unit 300 includes a distance measurement information correction unit 301 and a detection unit 302. Functions of the extraction unit 200 and the correction unit 300 are implemented by software. Specifically, the functions of the extraction unit 200 and the correction unit 300 are implemented by a distance measurement correction program. The distance measurement correction program is a program for causing a computer to execute processing to be performed by the extraction unit 200 and the correction unit 300 as an acquisition process, a movement calculation process, a correction direction extraction process, a distance measurement information correction process, and a detection process. A distance measurement correction method is a method to be performed through execution of the distance measurement correction program by the distance measurement correction system 500. The distance measurement correction program may be provided recorded on a computer-readable medium, be provided stored in a recording medium or a storage medium, or be provided as a program product.

The processor 11 is an IC (Integrated Circuit) which performs arithmetic processing. A specific example of the processor 11 is a CPU, a DSP, or a GPU. The processor 11 is a device which executes the distance measurement correction program. "CPU" stands for Central Processing Unit. "DSP" stands for Digital Signal Processor. "GPU" stands for Graphics Processing Unit.

The memory 12 is a device which stores in advance or temporarily stores the distance measurement correction program. A specific example of the memory 12 is a RAM, a flash memory, or a combination thereof "RAM" stands for Random Access Memory.

The I/O interface 13 includes a receiver which receives data to be input to the distance measurement correction program and a transmitter which transmits data output from the distance measurement correction program. The I/O interface 13 is a circuit which acquires data from the sensor 1 in accordance with an instruction from the processor 11. A specific example of the I/O interface 13 is a communication chip or a NIC. "NIC" stands for Network Interface Card.

The distance measurement correction device 10 may further include, as pieces of hardware, an input instrument and a display. The input instrument is an instrument which is manipulated by a user to input data to the distance measurement correction program. A specific example of the input instrument is a mouse, a keyboard, a touch panel, or a combination of some or all thereof. The display is an instrument which displays data output from the distance measurement correction program on a screen. A specific example of the display is an LCD. "LCD" stands for Liquid Crystal Display.

The distance measurement correction program is read from the memory 12 into the processor 11 and is executed by the processor 11. Not only the distance measurement correction program but also an OS is stored in the memory 12. "OS" stands for Operating System. The processor 11 executes the distance measurement correction program while executing the OS. Note that a part or the whole of the distance measurement correction program may be incorporated in the OS.

The distance measurement correction program and the OS may be stored in an auxiliary storage device. A specific example of the auxiliary storage device is an HDD, a flash memory, or a combination thereof "HDD" stands for Hard Disk Drive. If the distance measurement correction program and the OS are stored in the auxiliary storage device, the distance measurement correction program and the OS are loaded into the memory 12 and are executed by the processor 11.

The distance measurement correction device 10 may include a plurality of processors which substitute for the processor 11. The plurality of processors share execution of the distance measurement correction program. A specific example of each processor is a CPU.

Data, information, a signal value, and a variable value to be used, processed, or output by the distance measurement correction program are stored in the memory 12, the auxiliary storage device, or a register or a cache memory in the processor 11. In particular, data which can be acquired by the I/O interface 13, a calculation result from the distance measurement correction program, direction and time information 15, and body velocity information 16 are stored in the memory 12. The direction and time information 15 includes information on a direction of distance measurement by the sensor 1, the order of distance measurement, and time information for each distance measurement. The body velocity information 16 includes a threshold velocity 161 corresponding to a body 3. Specifically, the threshold velocity 161 is a maximum velocity at which the body 3 as an object to be measured by the sensor 1 can move. Data and information stored in the memory 12 are input and output in accordance with a request from the processor 11.

\*\*\*Description of Operation\*\*\*

Figure 4:
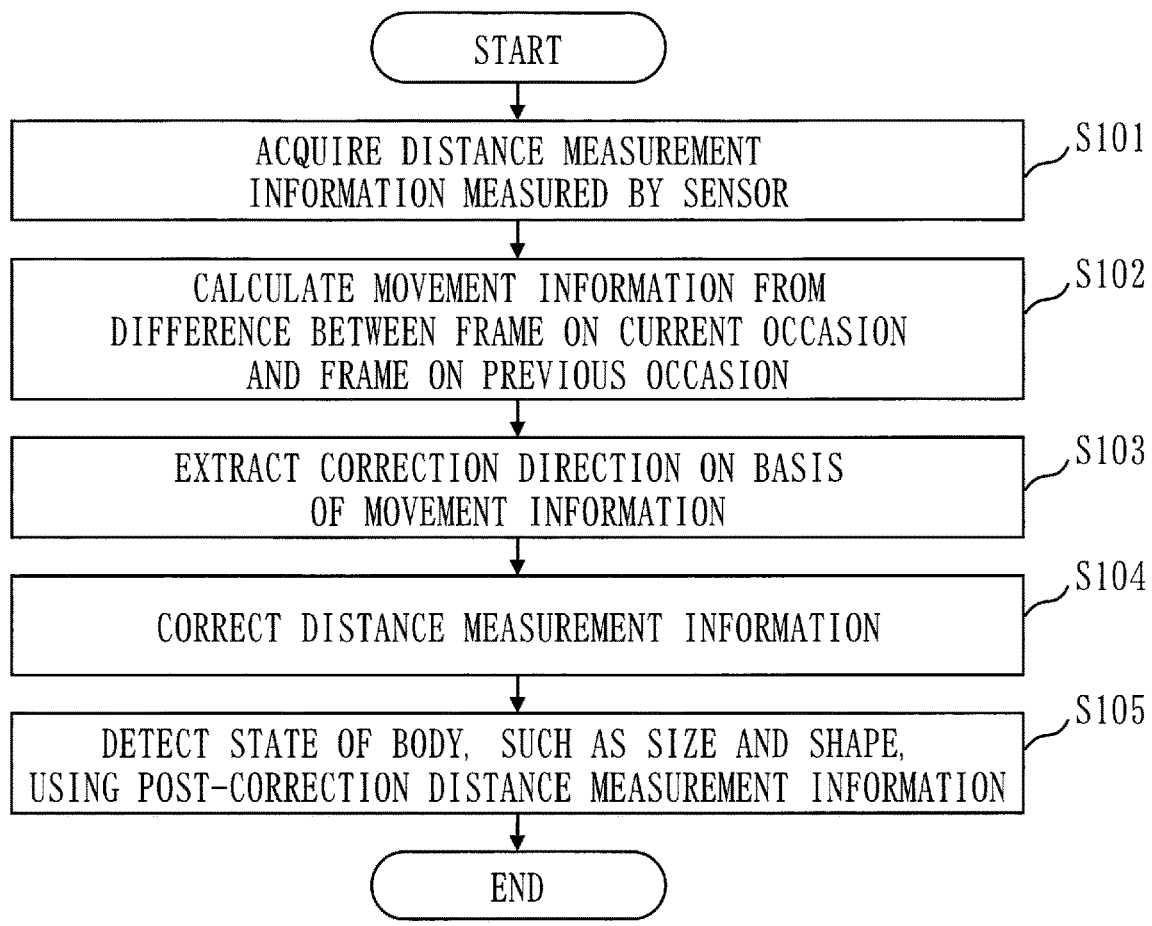
FIG. 4 is a flowchart showing operation of the distance measurement correction system according to Embodiment 1.

Operation of the distance measurement correction system 500 according to the present embodiment will be described with reference to FIG. 4.

A distance measurement correction process by the distance measurement correction system 500 according to the present embodiment is implemented by combination of operation of the distance measurement correction device 10 and operation of the sensor 1.

The distance measurement correction device 10 corrects pieces of distance measurement information 31 obtained by measuring, through one cycle, a space between the sensor 1 and the body 3, at least one of which moves, by the sensor 1, the pieces of distance measurement information 31 being respective distances from the sensor 1 to the body 3 in a plurality of directions.

Specifically, the sensor 1 is a laser sensor, such as a LiDAR.

Figure 5:
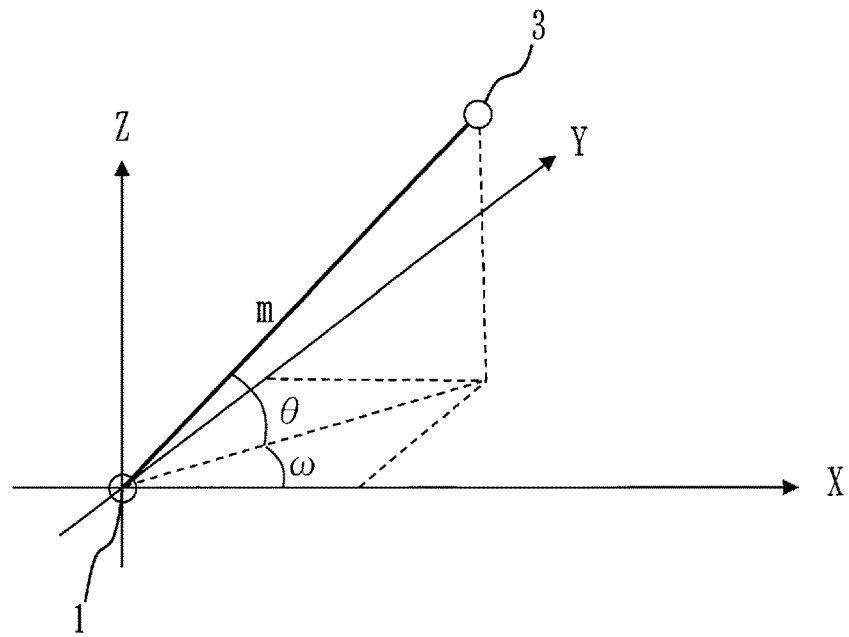
FIG. 5 is a chart showing distance measurement by a sensor according to Embodiment 1.

FIG. 5 is a chart showing distance measurement by the sensor 1 according to the present embodiment.

The sensor 1 applies lasers in the plurality of directions, receives light beams reflected from the body 3, and calculates distances to the body. The sensor 1 measures a distance m to an obstacle at each angle $(\theta, \omega)$ about the sensor 1, as shown in FIG. 5.

In step S101, the acquisition unit 201 acquires, via the I/O interface 13, distance information from the sensor 1 to the body 3 which is obtained by the sensor 1. The distance information is a distance from the sensor 1 to the body 3 in each direction. The acquisition unit 201 acquires, as pieces of distance measurement information 31, pieces of distance information measured through one cycle by the sensor 1. That is, the pieces of distance measurement information 31 are pieces of distance information for one frame.

The acquisition unit 201 acquires the pieces of distance measurement information 31 for one frame measured on a current occasion and pieces of distance measurement information for a previous frame measured on a previous occasion. Note that the pieces of distance measurement information 31 acquired by the acquisition unit 201 are stored in the memory 12. The acquisition unit 201 acquires the pieces of distance measurement information for the previous frame measured on the previous occasion from the memory 12.

In step S102, the movement calculation unit 202 calculates, as pieces of movement information 32, respective movement distances of the body 3 with respect to the sensor 1 in a plurality of directions on the basis of a difference between the pieces of distance measurement information 31 measured on the current occasion by the sensor 1 and the pieces of distance measurement information measured on the previous occasion by the sensor 1.

Specifically, the movement calculation unit 202 obtains, as movement distances, a difference between pieces of distance information for each direction of the most recent frame, using data of the previous frame and data of a most recent frame, that is, the frame acquired on the current occasion by the sensor 1. The movement calculation unit 202 calculates, as the pieces of movement information 32, the movement distances for the respective directions of the most recent frame. Note that, if a measurement direction of data of the most recent frame and a measurement direction of data of the previous frame are not identical, data of the previous frame which is identical in direction to the most recent frame is created using data for a closest direction of the previous frame, and pieces of movement information 32 for the respective directions of the most recent frame are calculated.

In step S103, the correction direction extraction unit 203 calculates, as body movement velocities, movement velocities of the body 3 using the respective pieces of movement information 32 for the plurality of directions. The correction direction extraction unit 203 extracts, as a correction direction 33, a direction, for which the distance measurement information 31 is to be corrected, from among the plurality of directions, on the basis of the body movement velocities. The correction direction extraction unit 203 extracts, as the correction direction 33, each of the plurality of directions if the body movement velocity in the direction of the plurality of directions is equal to or less than a threshold which is calculated on the basis of the threshold velocity 161. Extraction of the correction directions 33 corresponds to extraction of a region, for which the pieces of distance measurement information 31 are to be corrected.

Specifically, the correction direction extraction unit 203 obtains a region, for which the pieces of distance measurement information 31 are to be corrected, using the pieces of movement information for the respective directions. In the case of a stationary body, since there is little distance measurement variation within a micro time period within one frame, correction processing is not performed. On the other hand, in a case where distance measurement of an obstacle is performed for a most recent frame and another distant body is measured for a previous frame, a difference in distance information is large. The same applies to a case where the most recent frame and the previous frame are reversed. In this case, even if distance measurement information for an arbitrary time period is created using data of the most recent frame and data of the previous frame, the distance measurement information is not correct information. For this reason, a body movement velocity which is conceivable for a usage condition is used as a threshold, and a direction which has a variation and whose variation is equal to or less than the threshold is extracted. Note that the threshold is calculated using the body velocity information 16 and using a movement velocity of the sensor 1 and the threshold velocity 161, that is, a maximum velocity for the body 3 which is conceivable in a space where the sensor 1 is present. The threshold velocity 161 that is a maximum velocity which the body 3 can take is stored in the body velocity information 16.

Figure 6:
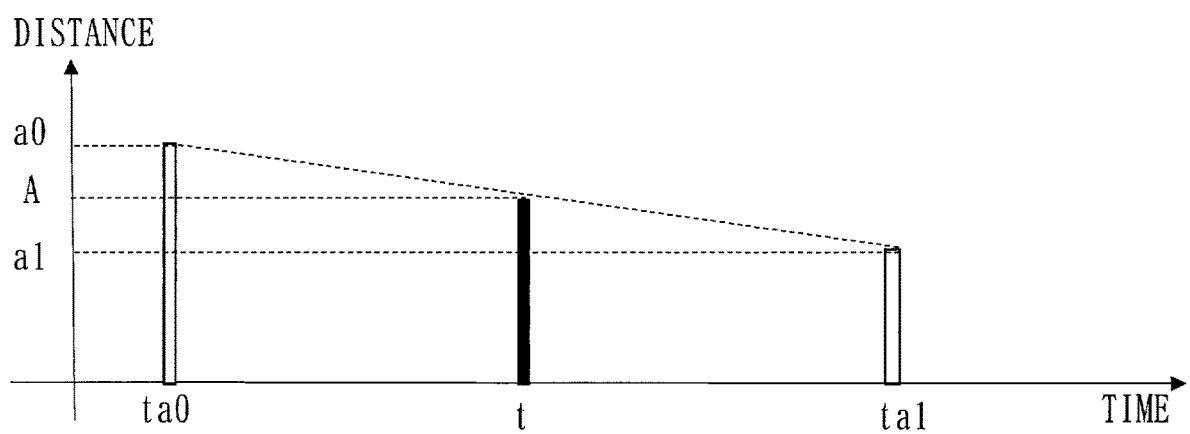
FIG. 6 is a chart showing correction of distance measurement information by a distance measurement information correction unit according to Embodiment 1.

FIG. 6 is a chart showing correction of distance measurement information by the distance measurement information correction unit 301 according to the present embodiment.

In step S104, the distance measurement information correction unit 301 calculates, for each of the correction directions 33, a distance A from the sensor 1 to the body at a correction time point t between a time point ta0 of measurement on the previous occasion by the sensor 1 and a time point ta1 of measurement on the current occasion by the sensor 1. The distance measurement information correction unit 301 sets the distance A as post-correction distance measurement information 34.

Specifically, the distance measurement information correction unit 301 obtains, for the correction directions among the plurality of directions, that is, the region extracted by the extraction unit 200, pieces of distance information from the sensor 1 for the respective directions at the correction time point t that is an arbitrary time. As shown in FIG. 6, let a0 and a1 be distance measurement results for an identical direction for the previous frame and the most recent frame. Also, let ta0 and ta1 be respective distance measurement times. In this case, the post-correction distance A at the time t can be calculated by Expression 1 below.

$$A = a0 + (a1-a0)*(t-t-0)/(ta1-ta0) \quad \text{(Expression 1)}$$

In step S105, the detection unit 302 detects a state of the body 3 using the pieces of post-correction distance measurement information 34. The state of the body 3 refers to information, such as the size and shape of a body. Specifically, the detection unit 302 may develop a movement velocity in a two-dimensional array using an angle $(\theta,\omega)$ which is information acquired from a distance measurement information sensor and group similar regions with adjacent values as one body, as for a body size. Alternatively, the detection unit 302 may make a plot in a three-dimensional space on the basis of corrected distance measurement information and directions and regard a group of points present at short distances as one group to create a body. The detection unit 302 then obtains shape information, such as the size and flatness or a curvature of a body, from grouped pieces of data.

Description of Advantageous Effects of Present Embodiment

A distance measurement correction device according to the present embodiment is a device which handles distance measurement information output by a sensor. An extraction unit compares pieces of distance measurement information from the sensor to an obstacle for respective directions with pieces of distance measurement information of a previous frame to calculate an amount of change and extracts a region for which pieces of distance measurement information are to be corrected. A correction unit calculates pieces of distance measurement information for respective directions at an identical time for the extracted region to obtain the shape and size of a body. The extraction unit has a function of setting a threshold for determining that a body is moving, using maximum velocity information for a body serving as an object of distance measurement.

As described above, a distance measurement correction system according to the present embodiment extracts a body movement region from amounts of change in distance information in respective directions, using data of a most recent frame and data of a previous frame which are acquired by a sensor. The distance measurement correction system according to the present embodiment performs distance measurement information correction on the movement region. Thus, the distance measurement correction system according to the present embodiment is capable of executing distance measurement information correction with high accuracy and of detecting, with high accuracy, a state of a body, such as the size and shape of the body.

Other Configurations

Modification 1

In the present embodiment, the functions of the extraction unit 200 and the correction unit 300 are implemented by software. As a modification, functions of the extraction unit 200 and the correction unit 300 may be implemented by hardware. Specifically, the distance measurement correction device 10 includes an electronic circuit instead of the processor 11.

The electronic circuit is a dedicated electronic circuit which implements the functions of the extraction unit 200 and the correction unit 300.

Specifically, the electronic circuit is a single circuit, a composite circuit, a programmed processor, a parallel-programmed processor, a logic IC, a GA, an ASIC, or an FPGA. "GA" stands for Gate Array. "ASIC" stands for Application Specific Integrated Circuit. "FPGA" stands for Field-Programmable Gate Array.

The functions of the extraction unit 200 and the correction unit 300 may be implemented by one electronic circuit or may be distributed to and implemented by a plurality of electronic circuits.

As another modification, some of the functions of the extraction unit 200 and the correction unit 300 may be implemented by an electronic circuit, and the others may be implemented by software. Alternatively, some or all of the functions of the extraction unit 200 and the correction unit 300 may be implemented by firmware.

Each of a processor and an electronic circuit is also called processing circuitry. That is, in the distance measurement correction device 10, the functions of the extraction unit 200 and the correction unit 300 are implemented by processing circuitry.

Embodiment 2

The present embodiment will mainly describe differences from Embodiment 1. Note that the same components as those in Embodiment 1 are denoted by identical reference characters and that a description thereof will be omitted.

In Embodiment 1, a threshold is defined on the basis of the body velocity information 16 at the time of extraction of a region for which distance measurement information is to be corrected. In the present embodiment, a threshold is defined using body velocity information 16 and movement information of a sensor 1.

*Description of Configuration*

Figure 7:
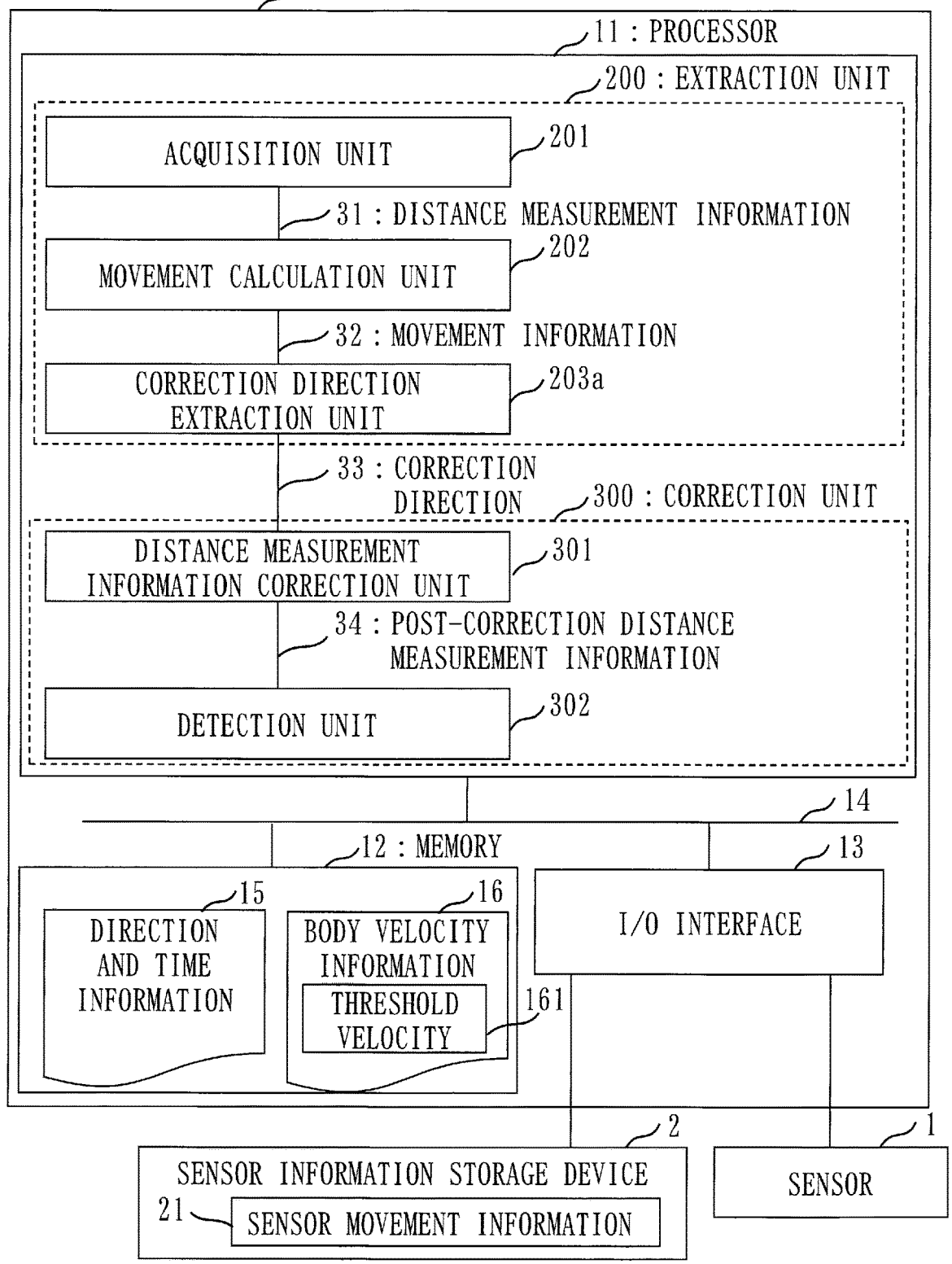
FIG. 7 is a configuration diagram of a distance measurement correction system according to Embodiment 2.

FIG. 7 is a configuration diagram of a distance measurement correction system 500a according to the present embodiment.

The distance measurement correction system 500a according to the present embodiment includes a sensor information storage device 2 in addition to the components of the distance measurement correction system 500 according to Embodiment 1. The sensor information storage device 2 is connected to a distance measurement correction device 10 via an I/O interface 13.

The sensor information storage device 2 stores sensor movement information 21 which includes a movement velocity of the sensor 1 and a movement direction of the sensor 1.

*Description of Operation*

Figure 8:
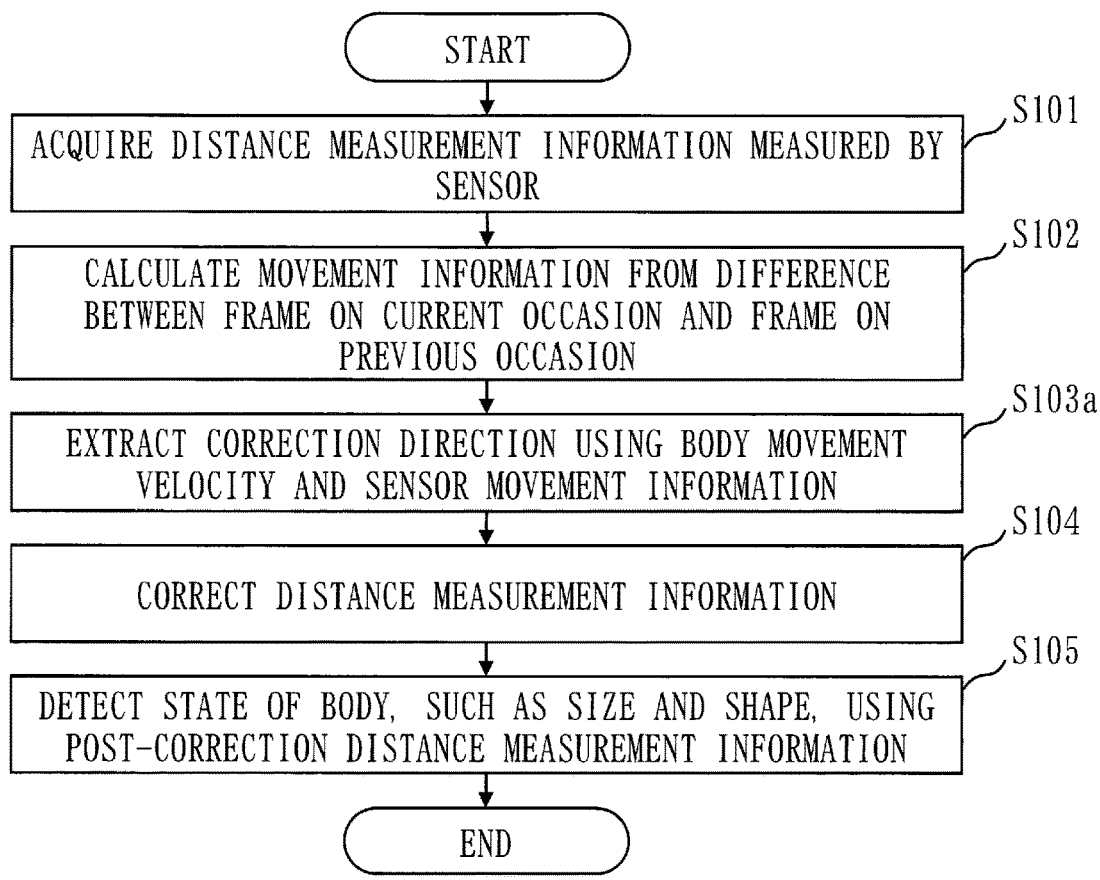
FIG. 8 is a flowchart showing operation of the distance measurement correction system according to Embodiment 2.

Operation of the distance measurement correction system 500a according to the present embodiment will be described with reference to FIG. 8.

Processes in steps S101 and S102 are the same as in Embodiment 1.

In step S103a, a correction direction extraction unit 203a extracts a correction direction 33 from among a plurality of directions on the basis of respective body movement velocities in the plurality of directions and the sensor movement information 21 including the sensor movement velocity and the sensor movement direction. Information on a position where the sensor 1 is present may be included in the sensor movement information 21.

Figure 9:
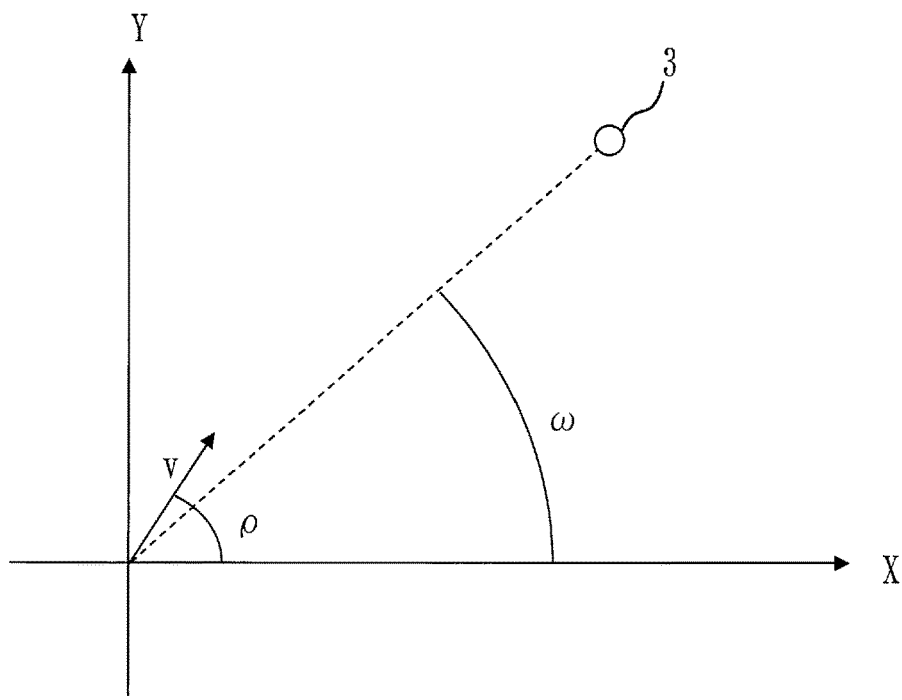
FIG. 9 is a chart showing an example of use of sensor movement information according to Embodiment 2.

FIG. 9 is a chart showing an example of use of the sensor movement information 21 according to the present embodiment.

The correction direction extraction unit 203a adjusts a threshold which is used to obtain a correction direction, for which distance measurement information 31 is to be corrected, in accordance with the sensor movement information 21 and the position where the sensor 1 is present. The sensor movement information 21 includes the movement direction of the sensor 1 and the movement velocity of the sensor 1.

Specifically, if the sensor 1 is moving at a velocity v and an angle ρ, as shown in FIG. 9, the correction direction extraction unit 203a subtracts v*cos(ρ−ω) from the threshold.

Specifically, the information on the position where the sensor 1 is present is information as to whether the sensor 1 is present on a general road or the sensor 1 is present on an expressway. Specifically, if the sensor 1 is present on a general road, a threshold velocity 161 for a body 3 is set to 80 km/h. If the sensor is present on an expressway, the threshold velocity 161 is set to 100 km/h. As described above, the information on the position where the sensor 1 is present is used to switch the threshold velocity 161, that is, a maximum velocity for the body 3.

Processes in steps S104 and S105 are the same as in Embodiment 1.

Description of Advantageous Effects of Present Embodiment

In a distance measurement correction device according to the present embodiment, an extraction unit has a function of extracting a region, for which pieces of distance measurement information are to be corrected, using movement information and position information of a sensor. A correction unit calculates pieces of distance measurement information for respective directions at an identical time for the extracted region to obtain a state of a body, such as the shape and size of the body. The distance measurement correction device according to the present embodiment is capable of adjusting a threshold which is used to extract a region, for which pieces of distance measurement information are to be corrected, in accordance with the movement information of the sensor or a position where the sensor is present. The distance measurement correction device according to the present embodiment is thus capable of correcting distance measurement information with higher accuracy.

Embodiments 1 and 2 above each have described, as independent functional blocks, units of a distance measurement correction device. A configuration of a distance measurement correction device, however, may not be like those of the above-described embodiments. Functional blocks of the distance measurement correction device may be configured in any manner as long as the functions described in the above embodiments can be implemented. The distance measurement correction device may be a system which is composed not of one device but of a plurality of devices.

A plurality of portions of Embodiments 1 and 2 may be combined and carried out. Alternatively, one portion of the embodiments may be carried out. The embodiments may be combined and carried out in any manner, in whole or in part.

That is, as for Embodiments 1 and 2, the embodiments can be freely combined, any constituent element in each embodiment can be modified, or any constituent element can be omitted in each embodiment.

Note that the embodiments described above are merely preferred examples in nature and are not intended to limit the scope of the present invention, applications of the present invention, and use of the present invention. Various changes can be made to the above-described embodiments as needed.

REFERENCE SIGNS LIST

1: sensor; 2: sensor information storage device; 3: body; 10: distance measurement correction device; 11: processor; 12: memory; 13: I/O interface; 14: signal line; 15: direction and time information; 16: body velocity information; 21: sensor movement information; 31: distance measurement information; 32: movement information; 33: correction direction; 34: post-correction distance measurement information; 161: threshold velocity; 200: extraction unit; 201: acquisition unit; 202: movement calculation unit; 203, 203a: correction direction extraction unit; 300: correction unit; 301: distance measurement information correction unit; 302: detection unit; 500, 500a: distance measurement correction system

The invention claimed is:

1. A distance measurement correction device that corrects distance measurement information between a sensor and a body, at least one of which moves, the distance measurement information being respective distances in a plurality of directions from the sensor to the body that are measured through one cycle by the sensor, the distance measurement correction device comprising:

processing circuitry
to calculate respective movement distances of the body with respect to the sensor in the plurality of directions as pieces of movement information, on the basis of a difference between distance measurement information measured on a current occasion by the sensor and distance measurement information measured on a previous occasion by the sensor,
to calculate movement velocities of the body as body movement velocities using the respective pieces of movement information for the plurality of directions and to extract a direction, for which the distance measurement information is to be corrected, as a correction direction from among the plurality of directions, on the basis of a result of comparing the body movement velocities to a threshold, and
to calculate a distance from the sensor to the body for the correction direction at a correction time point between a time point of measurement on the previous occasion by the sensor and a time point of measurement on the current occasion by the sensor as post-correction distance measurement information, wherein
the processing circuitry extracts each of the plurality of directions as the correction direction if the body movement velocity in the corresponding direction of the plurality of directions is equal to or less than the threshold,
the threshold is the velocity for determining that the body is moving, and the threshold is calculated on the basis of a threshold velocity corresponding to the body.

2. The distance measurement correction device according to claim 1, wherein
the processing circuitry detects a state of the body using the post-correction distance measurement information.

3. The distance measurement correction device according to claim 1, wherein
the distance measurement correction device has, in a memory, body velocity information including the threshold velocity.

4. The distance measurement correction device according to claim 2, wherein
the distance measurement correction device has, in a memory, body velocity information including the threshold velocity.

5. The distance measurement correction device according to claim 1, wherein
the distance measurement correction device has, in a memory, body velocity information including the threshold velocity, and
the processing circuitry extracts the correction direction from among the plurality of directions on the basis of the respective body movement velocities in the plurality of directions and sensor movement information including a movement velocity of the sensor and a movement direction of the sensor.

6. The distance measurement correction device according to claim 2, wherein
the distance measurement correction device has, in a memory, body velocity information including the threshold velocity, and
the processing circuitry extracts the correction direction from among the plurality of directions on the basis of the respective body movement velocities in the plurality of directions and sensor movement information including a movement velocity of the sensor and a movement direction of the sensor.

7. A distance measurement correction system comprising:
a distance measurement correction device to correct distance measurement information between a sensor and a body, at least one of which moves, the distance measurement information being respective distances in a plurality of directions from the sensor to the body that are measured through one cycle by the sensor; and
the sensor, wherein
the distance measurement correction device includes
processing circuitry
to calculate respective movement distances of the body with respect to the sensor in the plurality of directions as pieces of movement information, on the basis of a difference between distance measurement information measured on a current occasion by the sensor and distance measurement information measured on a previous occasion by the sensor,
to calculate movement velocities of the body as body movement velocities using the respective pieces of movement information for the plurality of directions and to extract a direction, for which the distance measurement information is to be corrected, as a correction direction from among the plurality of directions, on the basis of a result of comparing the body movement velocities to a threshold, and
to calculate a distance from the sensor to the body for the correction direction at a correction time point between a time point of measurement on the previous occasion by the sensor and a time point of measurement on the current occasion by the sensor as post-correction distance measurement information, wherein
the processing circuitry extracts each of the plurality of directions as the correction direction if the body movement velocity in the corresponding direction of the plurality of directions is equal to or less than the threshold,
the threshold is the velocity for determining that the body is moving, and
the threshold is calculated on the basis of a threshold velocity corresponding to the body.

8. The distance measurement correction system according to claim 7, comprising:
a sensor information storage device to store sensor movement information including a movement velocity of the sensor and a movement direction of the sensor, wherein
the distance measurement correction device has, in a memory, body velocity information including the threshold velocity, and
the processing circuitry extracts the correction direction from among the plurality of directions on the basis of the respective body movement velocities in the plurality of directions and the sensor movement information stored in the sensor information storage device.

9. A distance measurement correction method for a distance measurement correction device that corrects distance measurement information between a sensor and a body, at least one of which moves, the distance measurement information being respective distances in a plurality of directions from the sensor to the body that are measured through one cycle by the sensor, the distance measurement correction method comprising:
calculating respective movement distances of the body with respect to the sensor in the plurality of directions as pieces of movement information, on the basis of a difference between distance measurement information measured on a current occasion by the sensor and distance measurement information measured on a previous occasion by the sensor;
calculating movement velocities of the body as body movement velocities using the respective pieces of movement information for the plurality of directions and extracting a direction, for which the distance measurement information is to be corrected, as a correction direction from among the plurality of directions, on the basis of a result of comparing the body movement velocities to a threshold; and
calculating a distance from the sensor to the body for the correction direction at a correction time point between a time point of measurement on the previous occasion by the sensor and a time point of measurement on the current occasion by the sensor as post-correction distance measurement information, wherein the distance measurement correction method further comprises:
determining each body movement velocity associated with a corresponding direction of the plurality of directions that is equal to or less than the threshold, and extracting each of the corresponding direction of the plurality of directions as the correction direction, and
calculating the threshold on the basis of a threshold velocity corresponding to the body wherein the threshold is the velocity for determining that the body is moving.

10. A non-transitory computer readable medium containing a distance measurement correction program for a distance measurement correction device that corrects distance measurement information between a sensor and a body, at least one of which moves, the distance measurement information being respective distances in a plurality of directions from the sensor to the body that are measured through one cycle by the sensor, the distance measurement correction program causing the distance measurement correction device as a computer to execute:

- a movement calculation process of calculating respective movement distances of the body with respect to the sensor in the plurality of directions as pieces of movement information, on the basis of a difference between distance measurement information measured on a current occasion by the sensor and distance measurement information measured on a previous occasion by the sensor;
- a correction direction extraction process of calculating movement velocities of the body as body movement velocities using the respective pieces of movement information for the plurality of directions and extracting a direction, for which the distance measurement information is to be corrected, as a correction direction from among the plurality of directions, on the basis of a result of comparing the body movement velocities to a threshold; and
- a distance measurement information correction process of calculating a distance from the sensor to the body for the correction direction at a correction time point between a time point of measurement on the previous occasion by the sensor and a time point of measurement on the current occasion by the sensor as post-correction distance measurement information, wherein the correction direction extraction process further comprises:
- extracting each of the plurality of directions as the correction direction if the body movement velocity in the corresponding direction of the plurality of directions is equal to or less than the threshold, and
- calculating the threshold on the basis of a threshold velocity corresponding to the body, wherein the threshold is the velocity for determining that the body is moving.

* * * * *